(12) United States Patent
Crotinger et al.

(10) Patent No.: US 11,575,235 B2
(45) Date of Patent: Feb. 7, 2023

(54) RETRACTING SYSTEMS FOR PROVIDING ACCESS TO ADAPTERS

(71) Applicant: Legrand AVD, Dayton, OH (US)

(72) Inventors: Jennifer Dawn Crotinger, Vista, CA (US); Child Kuan Leok Sun, Irvine, CA (US); Terry Lynn Smith, Springboro, OH (US)

(73) Assignee: Legrand AVD, Dayton, OH (US)

( * ) Notice: Subject to any disclaimer, the term of this patent is extended or adjusted under 35 U.S.C. 154(b) by 0 days.

(21) Appl. No.: 16/837,239

(22) Filed: Apr. 1, 2020

(65) Prior Publication Data

US 2021/0242645 A1    Aug. 5, 2021

Related U.S. Application Data

(60) Provisional application No. 62/967,976, filed on Jan. 30, 2020.

(51) Int. Cl.
*H01R 31/06* (2006.01)
*B65H 75/44* (2006.01)
*H01R 27/00* (2006.01)

(52) U.S. Cl.
CPC ......... *H01R 31/06* (2013.01); *B65H 75/4471* (2013.01); *H01R 27/00* (2013.01)

(58) Field of Classification Search
CPC ..... H01R 31/06; H01R 27/00; B65H 75/4471
(Continued)

(56) References Cited

U.S. PATENT DOCUMENTS 3,705,962 A * 12/1972 Banister ................. H02G 11/02
                                                        242/375
4,558,495 A * 12/1985 Olsen .................... B25B 33/005
                                                         24/298

(Continued)

FOREIGN PATENT DOCUMENTS

CN    104037564 A    9/2014
CN    209313148      8/2019

(Continued)

OTHER PUBLICATIONS

Crigger, Donella, 15 DIY Cord Organizers That Will Keep Your Wires Untangled Forever, https://www.onecrazyhouse.com/diy-cord-organizers/, Jan. 4, 2016.

(Continued)

*Primary Examiner* — Alexander Gilman
(74) *Attorney, Agent, or Firm* — McCarter & English, LLP (57) ABSTRACT

An adapter system is provided that facilitates convenient access to a plurality of adapters, e.g., DVI-D to HDMI adapter(s), Micro-HDMI to HDMI adapter(s), Mini-HDMI to HDMI adapter(s), Mini-DisplayPort to HDMI adapter(s), DisplayPort to HDMI adapter(s), VGA to HDMI adapter(s), MNL to HDMI adapter(s), and/or USB to HDMI adapter(s). The adapter system includes an elongated wire that features a plurality of adapters mounted/secured with respect thereto. The wire is at least partially stored within a housing and extends therefrom. The adapters are mounted/secured with respect to a portion of the wire that extends from the housing. The housing includes a retraction mechanism that facilitates retraction of the wire into the housing for convenient storage thereof. The present disclosure further provides structures that are configured and dimensioned to receive the disclosed housing, e.g., in office, commercial and/or residential environments, thereby facilitating access (Continued)

to the adapters that are mounted/secured with respect to the wire. In use, the disclosed adapter system permits a user to readily access and individually utilize each of the adapters mounted/secured with respect to the wire on an as-needed basis and to store at least the portion of the wire that does not include mounted/secured adapters within a housing. Retraction of the wire into the housing is facilitated by the disclosed retraction mechanism.

27 Claims, 11 Drawing Sheets

(58) Field of Classification Search
USPC .......................................................... 439/638
See application file for complete search history.

(56) References Cited

U.S. PATENT DOCUMENTS

| | | | | |
|---|---|---|---|---|
| 4,780,935 A * | 11/1988 | Palombit | ................ | H02G 11/02 24/17 AP |
| 5,673,829 A * | 10/1997 | Hartshorn | ................ | A45F 5/02 224/256 |
| 5,881,436 A * | 3/1999 | Lyons | .................... | F16L 3/233 24/17 A |
| 6,003,804 A * | 12/1999 | Vara | ........................ | H02G 11/02 242/405 |
| 6,186,451 B1 * | 2/2001 | Benoit | ................. | B60R 16/0215 248/74.3 |
| 6,499,199 B2 * | 12/2002 | Frazier | ................. | F16L 3/2336 24/30.5 R |
| 6,659,793 B1 * | 12/2003 | Chung | ................... | H01R 43/26 439/483 |
| 7,124,975 B2 * | 10/2006 | Richardson | .......... | B65H 75/366 242/402 |
| 7,163,424 B2 * | 1/2007 | Dancel | ............... | H01R 13/5825 439/731 |
| 7,469,854 B2 * | 12/2008 | Richardson | .......... | B65H 75/366 242/402 |
| 8,261,416 B2 * | 9/2012 | Rothbaum | .............. | F16G 11/14 242/360 |
| 8,491,503 B2 * | 7/2013 | Zaiken | ................... | G01R 31/28 600/588 |
| 8,615,849 B2 * | 12/2013 | Rothbaum | ........... | H04R 1/1033 24/303 |
| 8,678,332 B2 * | 3/2014 | Benthien | ................. | B64C 1/406 248/205.3 |
| 8,758,045 B2 * | 6/2014 | McSweyn | .............. | H01R 13/60 439/501 |
| 8,844,881 B2 * | 9/2014 | West | ...................... | F16L 3/1041 248/69 |
| 9,188,247 B2 * | 11/2015 | Pauchet | .................... | H02G 3/32 |
| 9,228,679 B2 * | 1/2016 | Koss | ........................ | F16L 3/137 |
| 9,693,701 B2 * | 7/2017 | Simpson | ................... | A61N 1/05 |
| 9,784,338 B1 * | 10/2017 | Parrett | .................... | H01R 31/06 |
| 10,041,565 B1 | 8/2018 | Parrett et al. | | |
| 10,364,123 B2 * | 7/2019 | Potts | .................... | B65H 49/205 |
| 10,468,817 B1 * | 11/2019 | Lee | ....................... | H01R 13/502 |
| 2003/0066169 A1 * | 4/2003 | Liu | ......................... | B65D 63/16 24/16 PB |
| 2005/0091822 A1 * | 5/2005 | Powers | .................... | F16B 19/14 411/441 |
| 2005/0134214 A1 | 6/2005 | Geiger | | |
| 2006/0073728 A1 * | 4/2006 | Zaiken | .................... | H01B 7/326 600/561 |
| 2007/0066130 A1 * | 3/2007 | Mori | ........................ | H01R 43/00 439/501 |
| 2008/0194149 A1 * | 8/2008 | Kim | ........................ | H01R 27/02 439/639 |
| 2009/0283649 A1 * | 11/2009 | Wood | ..................... | H02G 3/266 248/205.3 |
| 2017/0058569 A1 * | 3/2017 | Liu | ...................... | E05B 73/0005 |

FOREIGN PATENT DOCUMENTS

| | | |
|---|---|---|
| CN | 208433603 | 12/2019 |
| CN | 209881029 | 12/2019 |
| EP | 201154456.4 | 1/2021 |
| TW | M583632 | 9/2019 |

OTHER PUBLICATIONS

B & H Foto & Electronics Corp., Digitalinx DL-AR HDMI to Mobile Content Adapter Ring, 200-2019.
Extended European Search Report dated Jun. 21, 2021 for European Patent Application No. 21154457.2.
U.S. Appl. No. 62/967,967, filing date Jan. 30, 2020.

* cited by examiner

RETRACTING SYSTEMS FOR PROVIDING ACCESS TO ADAPTERS

CROSS-REFERENCE TO RELATED APPLICATION

The present application claims priority benefit to a provisional patent application entitled "Retracting Systems for Providing Access to Plurality of Adapters" that was filed on Jan. 30, 2020, and assigned Ser. No. 62/967,976. The entire content of the foregoing provisional patent application is incorporated herein by reference.

BACKGROUND

1. Technical Field

The present disclosure is directed to an adapter system that facilitates convenient access to one or more adapters. The adapter system includes an elongated wire that features adapter(s) mounted/secured with respect thereto, the wire being at least partially stored within a housing and extending therefrom. The housing includes a retraction mechanism that facilitates retraction of the wire into the housing for convenient storage thereof. Structures are also provided that receive the disclosed housing, thereby facilitating access to the adapter(s) that are mounted/secured with respect to the wire. In use, the disclosed adapter system permits a user to readily access and individually utilize each of the adapters mounted/secured with respect to the wire on an as-needed basis and to store at least the portion of the wire that does not include mounted/secured adapter(s) within a housing.

2. Background Art

As is well known, day-to-day use of the myriad electronics that support personal and professional activities require access to and use of a wide range of adapters. For example, communications with and between electronics, such as desk top computers, laptop computers, tablet computers and smart phones, require different adapters that depend on the device(s) at the other end of the desired communication. In a particular use case, delivery of a presentation to a third party/group/audience often requires communication from a presenter's computer (laptop/tablet/smart phone) to an accessory monitor or projection screen and the appropriate adapter must be available to facilitate such communication or the presentation will not be possible.

It has become commonplace for individuals to accumulate a collection of adapters for inter-electronic communications required in their personal and professional lives. Various approaches have been taken to storing and transporting these adapters, e.g., storage and transport by way of bags, cases and the like. There have also been efforts to provide devices/assemblies to facilitate storage and transport of adapters, e.g., cable tie systems (see, e.g., U.S. Pat. No. 6,186,451 to Benoit), cord organizing systems (see, e.g., U.S. Pat. No. 7,469,854 to Richardson), DIY systems (see, e.g., y37 DIY Cord Organizers That Will Keep Your Wires Untangled Forever; https://www.onecrazyhouse.com/diy-cor-organizers/), and adapter keychains (see, e.g., U.S. Pat. Nos. 9,784, 338 and 10, 041,565 to Parrett et al.; Digitalinx Secure Adapter Ring available from Liberty AV Solutions).

Despite efforts to date, a need remains for improved systems for storing, transporting and providing ready access to adapters for use in electronic communications on an as-needed basis. These and other needs are met by the disclosed systems and methods.

SUMMARY

The present disclosure provides advantageous systems for storage of and access to one or more adapters, e.g., a plurality of adapters. The disclosed systems include a housing that includes a retraction mechanism for applying a retraction force to a wire/cable that extends therefrom. A strain relief element may be positioned on the exterior of the housing and the wire/cable may pass therethrough, thereby minimizing the potential for damage to the wire/cable as it is extended to a desired location. The adapter(s) is/are mounted/secured with respect to the wire/cable and may include indicia (e.g., color indicia) that facilitate identification of the adapter type. The adapter(s) may be movably mounted with respect to the wire/cable, and relative movement may be bounded by stops/couplers positioned at either end thereof. At the free end of the wire/cable, a pull-tab may be provided to facilitate interaction with the wire/cable and the associated adapter(s).

The present disclosure further provides advantageous mounting assemblies that are configured and dimensioned to receive and cooperate with the disclosed adapter-related housings. Thus, mounting assemblies that define an internal region for receipt of the housing, e.g., for table mounting, are provided. In addition, mounting assemblies that facilitate wall-based or furniture-based mounting are provided, wherein the mounting assembly functions, at least in part, to visually mask the housing from view while simultaneously providing ready access to a wire/cable that extends therefrom (and, accordingly, adapters that may be associated with the wire/cable).

Additional features, functions and benefits of the disclosed systems will be apparent from the detailed description which follows, particularly when read in conjunction with the appended figures.

BRIEF DESCRIPTION OF FIGURES

To assist those of skill in the art in making and using the systems disclosed herein, reference is made to the accompanying figures, wherein.

DESCRIPTION OF EXEMPLARY EMBODIMENTS

The present disclosure provides adapter systems that facilitate convenient access to a plurality of adapters. The adapter system includes an elongated wire that features a plurality of adapters mounted/secured with respect thereto, the wire being at least partially stored within a housing and extending therefrom. The housing includes a retraction mechanism that facilitates retraction of the wire into the housing for convenient storage thereof. Structures are also provided that receive the disclosed housing, thereby facilitating access to the adapters that are mounted/secured with respect to the wire. In use, the disclosed adapter system permits a user to readily access and individually utilize each of the adapters mounted/secured with respect to the wire on an as-needed basis and to store at least the portion of the wire that does not include mounted/secured adapters within a housing.

Figure 1:
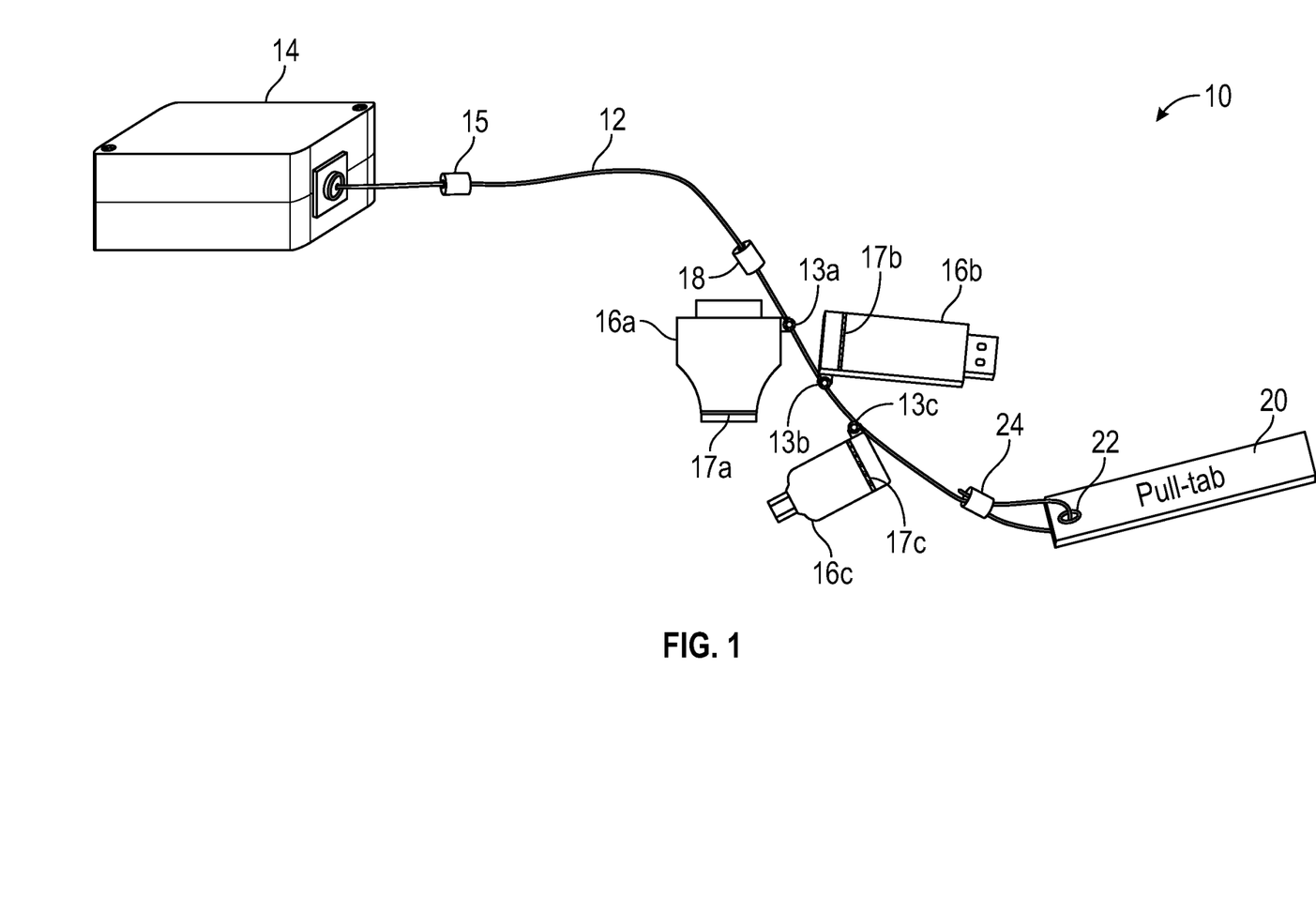
FIG. 1 is a perspective view of an exemplary system according to the present disclosure.

With reference to FIG. 1, exemplary system 10 includes an elongated wire 12 that extends from a housing 14 and is at least partially stored within housing 14. The wire 12 includes a plurality of adapters 16a, 16b, 16c mounted/secured with respect thereto along the wire 12. The adapters 16a, 16b, 16c may be fixedly mounted/secured with respect to wire 12. In alternative implementations, individual adapter(s) may be detachably mounted/secured with respect to wire 12. In exemplary implementations of system 10, adapters 16 may be movably mounted/secured with respect to wire 12, i.e., each adapter may be free to travel along wire 12.

Although system 10 includes three (3) adapters 16, the present disclosure is not limited by or to the depicted embodiment. Thus, system 10 may be implemented with as few as one (1) adapter and by more than three (3) adapters. Indeed, system 10 is generally implemented with a number and variety of adapters as may be desired by users in typical and/or specialized use cases.

Various securement mechanisms may be employed to mount/secure adapter(s) 16 relative to wire 12. For example, as shown in FIG. 1, adapters 16 may be mounted/secured relative to wire 12 by eyelets 13a, 13b, 13c that extend from the adapters 16a, 16b, 16c, respectively, and are joined to wire 12. Of note, eyelets 13a, 13b, 13c permit rotational freedom of movement for the adapters 16 relative to wire 12, thereby facilitating positioning of the adapter 16 relative to an electronic device(s) (not pictured) for insertion therein. In instances where the eyelets 13 permit longitudinal travel of adapters 16 relative to wire 12, further flexibility in positioning of adapters 16 relative to electronic devices is facilitated. The flexibility of wire 12—which is typically fabricated from steel and is between 24 and 12 gauge—further facilitates positioning of the individual adapters 16 for insertion in electronic devices. The eyelets 13 may also permit travel of adapters 16 along wire 12.

Eyelet 13 may be fabricated as part of an outer body of adapter 16, e.g., as part of the molding process, or may be retrofitted to an existing adapter 16, e.g., by way of an adhesive, sonic welding, mechanical clamping or the like. Eyelet 13 may allow passage of wire 12 through an opening defined thereby, or may be fixedly mounted relative to wire 12 in various ways, e.g., by way of crimping, adhesive or the like.

As shown in FIG. 1, system 10 includes a stop 18 mounted/secured between housing 14 and the first adapter 16a that is mounted/secured with respect to wire 12. Stop or coupler 18 limits the degree to which wire 12 may be withdrawn into housing 14, thereby protecting against direct contact between the adapter(s) 16 (particularly, first adapter 16a) and housing 14. Stop 18 also limits the travel of adapters 16 along wire 12 in implementations where eyelets 13 are not fixedly mounted/secured relative to wire 12. An optional additional stop 15 may be mounted/secured with respect to wire 12 to further control the minimum distance between the adapter(s) 16 and the housing 14. The precise positioning of optional stop 15 may be determined based on the desired minimum spacing of adapter(s)/housing.

Housing 14 is configured and dimensioned for storage of a desired extend of wire 12, e.g., in a rolled orientation, and typically houses a retraction mechanism for applying a retraction force to wire 12 when it is desired to withdraw wire 12 into housing 14. Housing 14 may be substantially box-like in geometry, thereby facilitating positioning of housing 14 relative to a structure that is configured/dimensioned for receipt thereof, e.g., in an office, commercial and/or residential setting. Exemplary retraction mechanisms that may be advantageously associated with housing 14 are described below.

As also shown in FIG. 1, system 10 includes a "pull tab" 20 mounted/secured with respect to the free end of wire 12. Pull tab 20 facilitates easy location of and interaction with system 10. In the exemplary implementation of FIG. 1, pull tab 20 includes a rivet/opening 22 that is dimensioned to allow passage of wire 12. Pull tab 20 is secured with respect to wire 12 by the doubling back of wire 12 after passage through rivet/opening 22 and securement of the doubled back portion of wire 12 with an original extent of wire 12, e.g., by way of connector 24. Connector 24 advantageously functions as a stop for travel of adapters 16 along wire 12 (away from housing 14) when the eyelets 13 permit adapter 16 travel along wire 12.

Adapters 16 may take various forms. For example, adapters may include a combination selected from the group consisting of DVI-D to HDMI adapter(s), Micro-HDMI to HDMI adapter(s), Mini-HDMI to HDMI adapter(s), Mini-DisplayPort to HDMI adapter(s), DisplayPort to HDMI adapter(s), VGA to HDMI adapter(s), MHL to HDMI adapter(s), and/or USB to HDMI adapter(s). The present disclosure is not limited by or to the foregoing exemplary adapters, but may be effectively and advantageously employed with alternative and/or additional adapters, including adapters yet-to-be-developed and/or yet-to-be-commercialized.

Adapters 16 may advantageously include an indicia 17 that designates the type of adapter. Thus, for example, indicia 17 may take the form of a color band positioned on a portion of the adapter 16, although alternative forms of indicia may be employed. In the exemplary embodiment of FIG. 1, system 10 includes adapter 16a with indicia 17a (red band), adapter 16b with indicia 17b (green band), and adapter 16c with indicia 17c (yellow band). The correlation of color coding relative to adapter type may be provided by a key, or may become widely known in the industry, e.g., through industry practice, thereby allowing a user to easily identify the adapter needed for a particular device/application.

Figure 2:
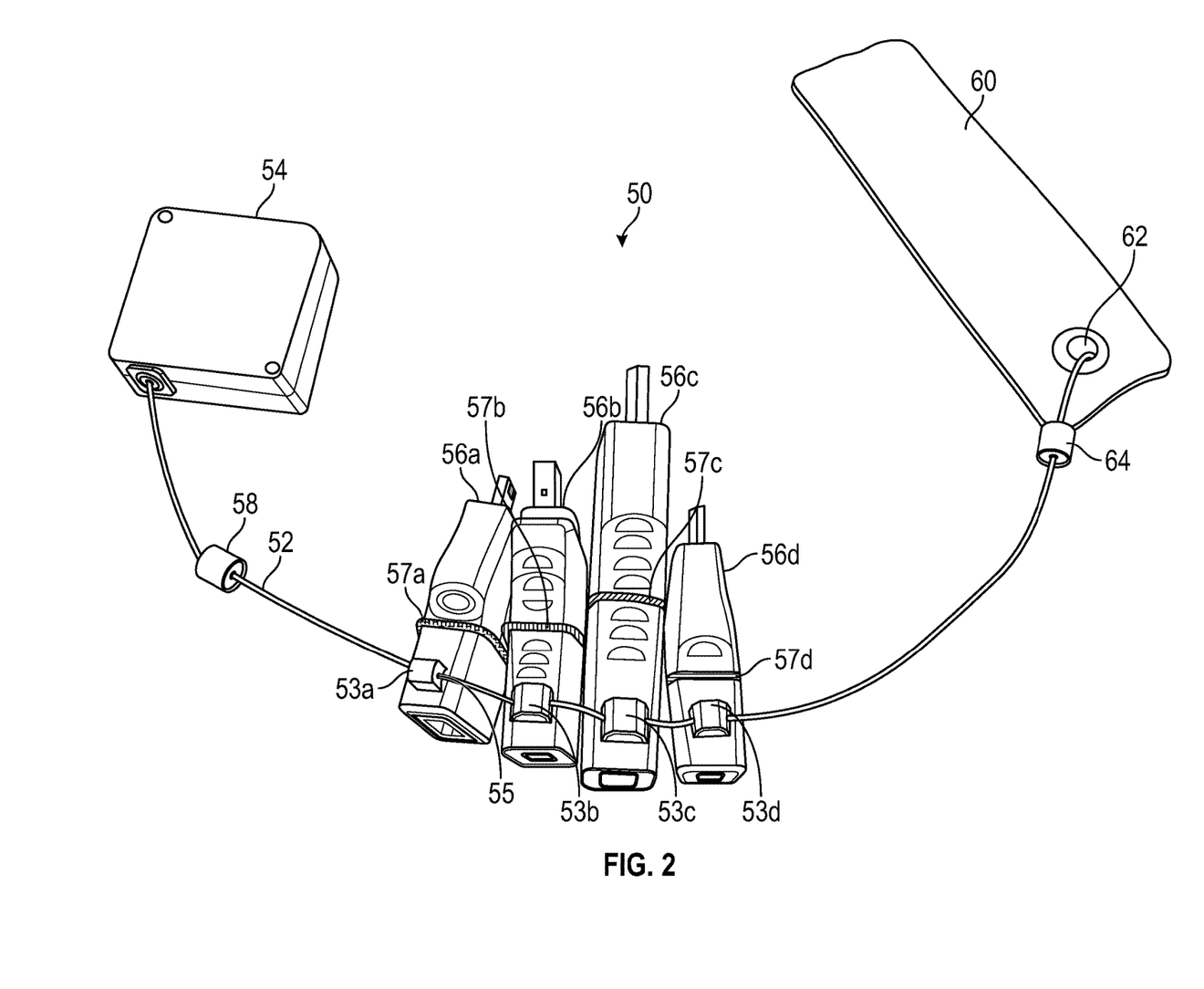
FIG. 2 is a perspective view of an alternative exemplary system according to the present disclosure.

Turning to FIG. 2, an alternative exemplary system 50 includes an elongated wire 52 that extends from a housing 54 and is at least partially stored within housing 54. The wire 52 includes a plurality of adapters 56a, 56b, 56c, 56d mounted/secured with respect thereto based on wire 52 passing through apertures 55 formed in tabs 53a, 53b, 53c, 53d that extend from adapters 56a, 56b, 56c, 56d, respectively. Tabs 53 are generally molded as part of the adapters 56, but retrofitting of tabs 53 onto adapters 56 may be undertaken, e.g., by way of adhesive, sonic welding, mechanical clamping or the like. Although system 50 includes four (4) adapters 56, the present disclosure is not limited by or to the depicted embodiment. Thus, system 50 may be implemented with as few as one (1) adapter and by more than four (4) adapters. System 50 is generally implemented with a number and variety of adapters as may be desired by users in typical and/or specialized use cases.

Tabs 53 permit rotational and longitudinal freedom of movement for adapters 56 relative to wire 52, thereby facilitating positioning of the adapters 56 relative to an electronic device(s) (not pictured) for insertion therein. The flexibility of wire 52—which is typically fabricated from steel at between 24 and 12 gauge—further facilitates positioning of the individual adapters 56 for insertion in electronic devices.

As shown in FIG. 2, system 50 includes a stop 58 mounted/secured between housing 54 and the first adapter 56a that is mounted/secured with respect to wire 52. Stop 58 limits the degree to which wire 52 may be withdrawn into housing 54, thereby protecting against direct contact between the adapter(s) 56 (particularly, first adapter 56a) and housing 54. As with housing 14, housing 54 is configured and dimensioned for storage of a desired extend of wire 52, e.g., in a rolled orientation, and typically houses a retraction mechanism for applying a retraction force to wire 52 when it is desired to withdraw wire 52 into housing 54. Housing 54 may be substantially box-like in geometry, thereby facilitating positioning of housing 54 relative to a structure that is configured/dimensioned for receipt thereof, e.g., in an office, commercial and/or residential setting. Exemplary retraction mechanisms that may be advantageously associated with housing 54 are described below.

As also shown in FIG. 2, system 50 includes a "pull tab" 60 mounted/secured with respect to the free end of wire 52. Pull tab 60 facilitates easy location of and interaction with system 50. For example, pull tab 60 may be dimensioned on the order of 80 mm×25 mm and may be fabricated of a durable fabric, e.g., a black fabric with two-side embroidered edges. In the exemplary implementation of FIG. 2, pull tab 60 includes a rivet/opening/eyelet 62 that is dimensioned to allow passage of wire 62. Pull tab 60 is secured with respect to wire 52 by the doubling back of wire 52 after passage through rivet/opening 62 and securement of the doubled back portion of wire 52 with an original extent of wire 52, e.g., by way of connector/coupler 64.

Connector/coupler 64 advantageously functions as a stop for travel of adapters 56 along wire 52 (away from housing 54).

As with adapters 16, adapters 56 may take various forms. For example, adapters may include a combination selected from the group consisting of DVI-D to HDMI adapter(s), Micro-HDMI to HDMI adapter(s), Mini-HDMI to HDMI adapter(s), Mini-DisplayPort to HDMI adapter(s), DisplayPort to HDMI adapter(s), VGA to HDMI adapter(s), MHL to HDMI adapter(s), and/or USB to HDMI adapter(s). The present disclosure is not limited by or to the foregoing exemplary adapters, but may be effectively and advantageously employed with alternative and/or additional adapters, including adapters yet-to-be-developed and/or yet-to-be-commercialized.

Adapters 56 may advantageously include an indicia 57 that designates the type of adapter. Thus, for example, indicia 57 may take the form of a color band positioned on a portion of the adapter 56, although alternative forms of indicia may be employed. In the exemplary embodiment of FIG. 2, system 50 includes adapter 56a with color indicia 57a, adapter 56b with color indicia 57b, adapter 56c with color indicia 57c and adapter 56d with color indicia 57d. The correlation of color coding relative to adapter type may be provided by a key, or may become widely known in the industry, e.g., through industry practice.

As noted above, various retraction mechanisms may be included in the disclosed housing 14, 54 to provide desired retraction functionality. For example, a cord reel mechanism may be employed that includes a torsional spring which provides the force required to retract the wire or cable 12, 52. A ratcheting mechanism allows the spool on which the wire/cord is wrapped to lock in different rotational configurations. The ratcheting mechanism consists of a spring-loaded pawl and gear. The gear is fabricated with teeth covering approximately two thirds of the circumference. The remaining one third of the circumference has no teeth and a small radius. This gap results in the pawl slipping on the teeth in only one direction, but when it is in the toothless region, it has the ability to switch directions, thereby allowing the wire/cord to retract freely. Alternative retraction mechanisms may be employed, as are known in the art. See, e.g., U.S. Pat. No. 3,705,962 to Banister, the content of which is incorporated herein by reference. The retraction mechanism typically includes a "lock-out" mechanism whereby the wire remains pulled out to a desired length until the user releases the lock-out mechanism and the wire is retracted by the retraction mechanism. The lockout feature may be effective to cause the wire to stop at preset distances and to remain extended until released for retraction.

Figure 3:
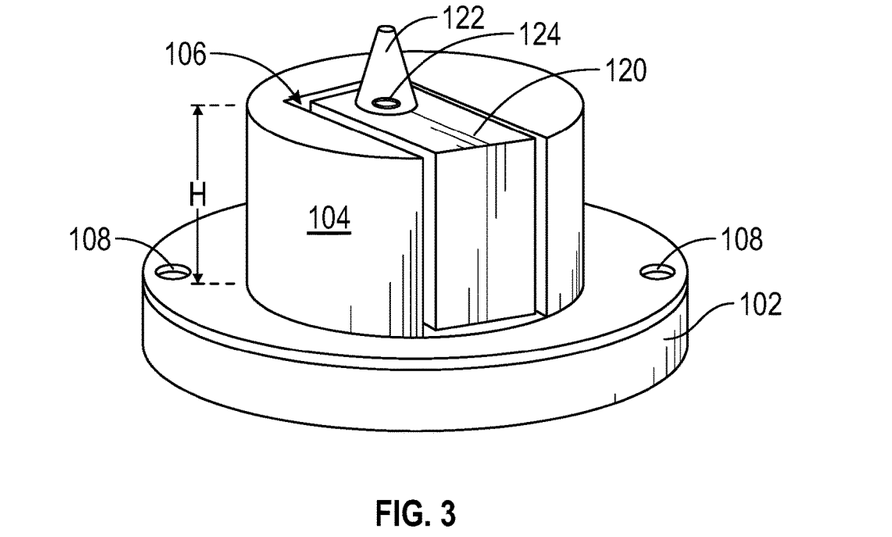
FIG. 3 is a perspective side view of an exemplary table top mounting structure according to the present disclosure.

Turning to FIG. 3, an exemplary assembly 100 for removably receiving a housing 120 is schematically depicted. Assembly 100 includes a base 102 and a upwardly extending body 104 that defines a substantially rectangular internal space 106 that is configured and dimensioned for receipt of housing 120. The height "H" of body 104 is advantageously selected so as to substantially correspond to the complementary dimension of housing 120, thereby defining a substantially flush upper surface when the housing 120 is positioned within the internal space 106 of body 104. The base 102 of exemplary assembly 100 is circular in geometry, but the present disclosure is not limited by or to such geometric configuration. Thus, for example, base 102 may be square/rectangular, oval, elliptical, triangular, pentagonal, hexagonal, octagonal or irregular in geometry. Base 102 includes mounting apertures 108 that facilitate mounting of assembly 100 relative to an ancillary structure (not pictured), e.g., a table, counter, desk, etc. In alternative embodiments, base 102 may be rotationally mounted relative to the ancillary structure, e.g., by way of a "lazy susan" type structure.

Housing 120 may advantageously correspond to housings 14, 54 of systems 10, 50, as described herein with reference to FIGS. 1 and 2, or an alternative housing that is configured and dimensioned to store a wire, e.g., an HDMI cable. Housing 120 may advantageously include a strain relief fitting 122 positioned adjacent the opening 124 through which wire/cable enters and exits housing 120. Additional disclosure relative to strain relief fitting(s) is provided with reference to FIG. 4 below.

Assembly 100 and housing 120, in combination, address a problem that frequently encounters shared use of electronic communication infrastructure, e.g., in a conference room or the like. In particular, adapters are needed in conference rooms to facilitate electronic communications, but clutter is generally to be avoided when/where possible. Also, adapters may be inadvertently misplaced or retained by temporary users/visitors. The assembly 100/housing 120 combination provides an efficient and effective approach to temporarily "parking" a housing that contains or delivers wire/cable and/or adapters to users, e.g., conference room attendees/visitors.

Figure 4:
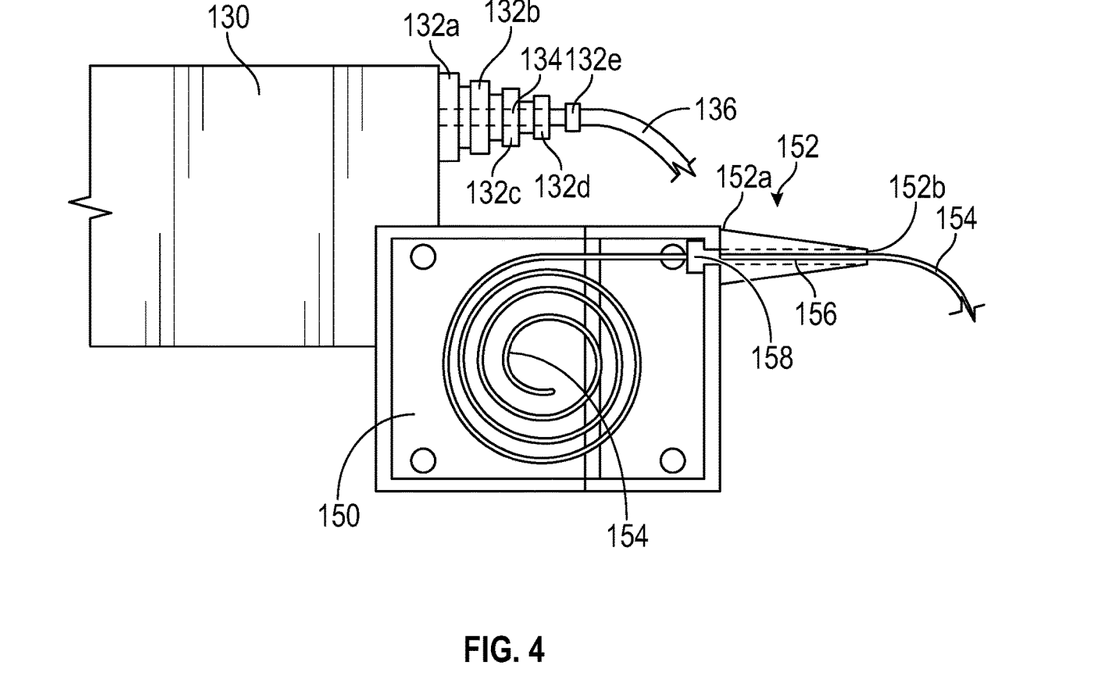
FIG. 4 is a side view of two housing embodiments with alternative strain relief features according to the present disclosure.

With reference to FIG. 4, two (2) alternative strain relief embodiments are schematically depicted. In the first "upper" embodiment, housing 130 includes frictionless strain relief 132 that is mounted with respect to and extends from housing 130. Strain relief 132 defines a plurality of spaced disks (5 disks are depicted in exemplary strain relief 132, i.e., disks 132a, 132b, 132c, 132d, 132e) that step down in diameter from the largest disk 132a that abuts the housing 130 to the smallest disk 132e that is furthest removed from housing 130. A substantially cylindrical channel 134 passes through the center of strain relief 132. Channel 134 is configured and dimensioned to receive and allow passage of cable 136, such that cable 136 may enter and exit housing 130. Strain relief 132 provides sufficient rigidity to permit "angling" of cable 136 relative to housing 130 without damaging the cable.

In the second "lower" embodiment of FIG. 4, housing 150 includes frictionless strain relief 152 that is mounted with respect to and extends from housing 150. Strain relief 152 defines a substantially conical exterior geometry that includes a circular base region 152a that abuts housing 150 and a reduced diameter tip region 152b from which cable 154 extends. A substantially cylindrical channel 156 passes through the center of strain relief 152. Channel 156 is configured and dimensioned to receive and allow passage of cable 154, such that cable 154 may enter and exit housing 150. Strain relief 152 provides sufficient rigidity to permit "angling" of cable 154 relative to housing 150 without damaging the cable.

Of note, the schematic depiction of housing 150 depicts exemplary internal aspects of the housing. In particular, FIG. 4 shows cable 154 wound within housing 150. Exemplary structures for winding of cable 154 include a reel (not pictured). In addition, the internal view of housing 150 shows a tee-shaped extension 158 that forms a portion of strain relief 152 and facilitates mounting of strain relief 152 relative to housing 150. Alternative mounting mechanisms may be employed, as will be apparent to persons skilled in the art.

Figure 5:
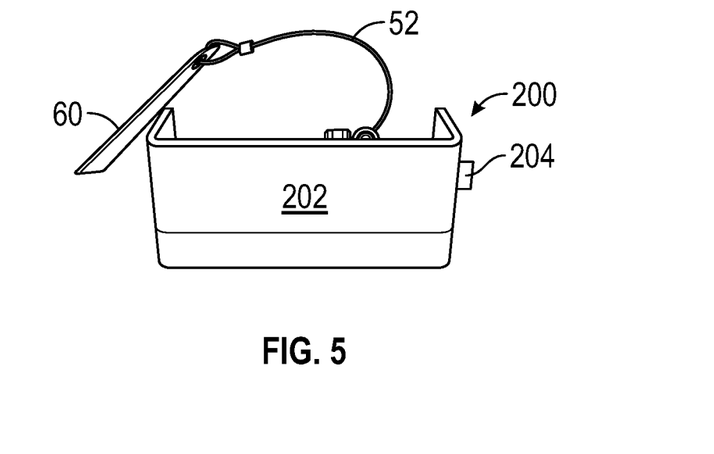
FIG. 5 is a front view of an exemplary mounting assembly associated with an adapter system according to the present disclosure.
Figure 6:
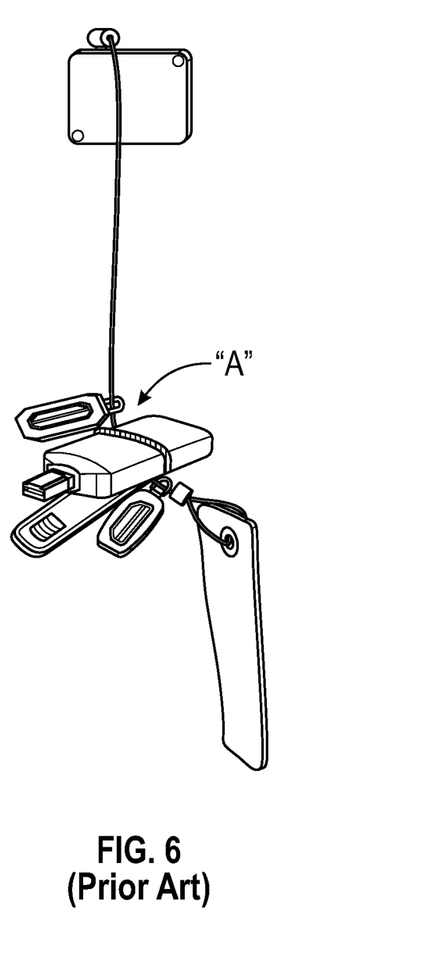
FIG. 6 (prior art) is a front view of a conventional approach to adapter storage.
Figure 7:
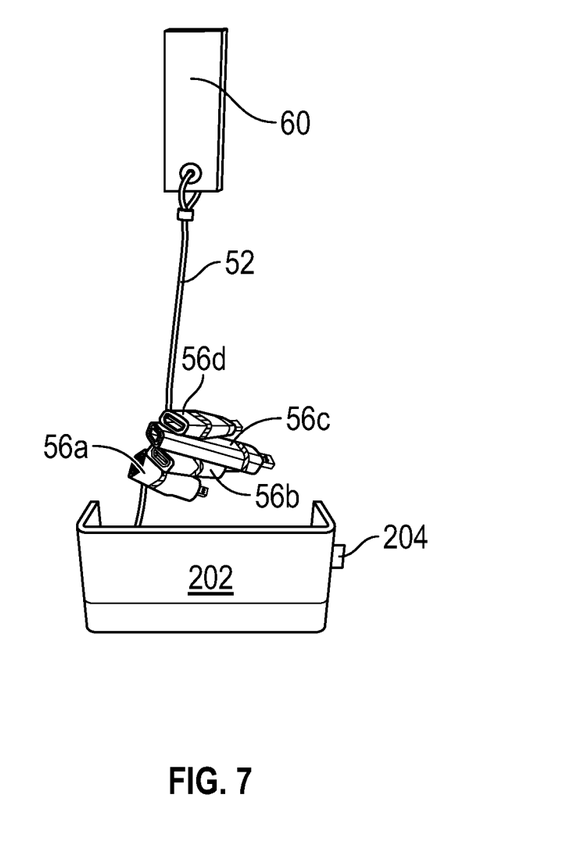
FIG. 7 is a front view of the mounting assembly of FIG. 5 with the adapters associated with the adapter system visible and accessible according to the present disclosure.

Turning to FIGS. 5-7, FIGS. 5 and 7 depict an exemplary mounting assembly 200 for receipt and support of a housing (not visible) that facilitates delivery of adapters to users on an as-needed basis according to the present disclosure, whereas FIG. 6 depicts a prior art approach to adapter storage and access. As shown in FIGS. 5 and 7, mounting assembly 200 defines a substantially U-shaped outer wall 202 that is adapted to be mounted with respect to a surface, e.g., the wall of a room, the side of a piece of furniture (e.g., a lectern), or the like. A pair of mounting flanges 204 (one visible) may be used to mount the mounting assembly 200 in a desired location.

Mounting assembly 200 further includes a base (not visible) that is dimensioned to cooperate with the substantially rectangular region defined by the U-shaped outer wall 202. A housing, e.g., housing 14 or housing 54, may be positioned behind the U-shaped outer wall 202 and atop the base, such that the housing 14, 54 is shielded from view (except when mounting assembly 200 is approached and structure(s) behind the outer wall 202 are inspected).

As shown in FIG. 5, the exemplary system 50 depicted in FIG. 2 is associated with mounting assembly 200. when the adapters are not needed or in use, the pull-tab 60 is visible and accessible to users. When a user desires to access/use an adapter associated with system 50, the user may extend pull-tab 60 in a desired direction, thereby lifting adapters 56a-56d into view. A desired adapter 56 may then be selected (e.g., based in whole or in part on color indicia associated with the adapter 56) and utilized to make a desired electronic connection.

The streamlined and visually desirable storage/delivery of adapters as depicted in FIG. 5 and FIG. 7 is to be contrasted with the cluttered and visually undesirable conditions associated with conventional adapter storage (as depicted in FIG. 6), where extra adapters "A" simply hang from a surface, e.g., a wall, in a disorganized and visually obtrusive manner.

Figure 8:
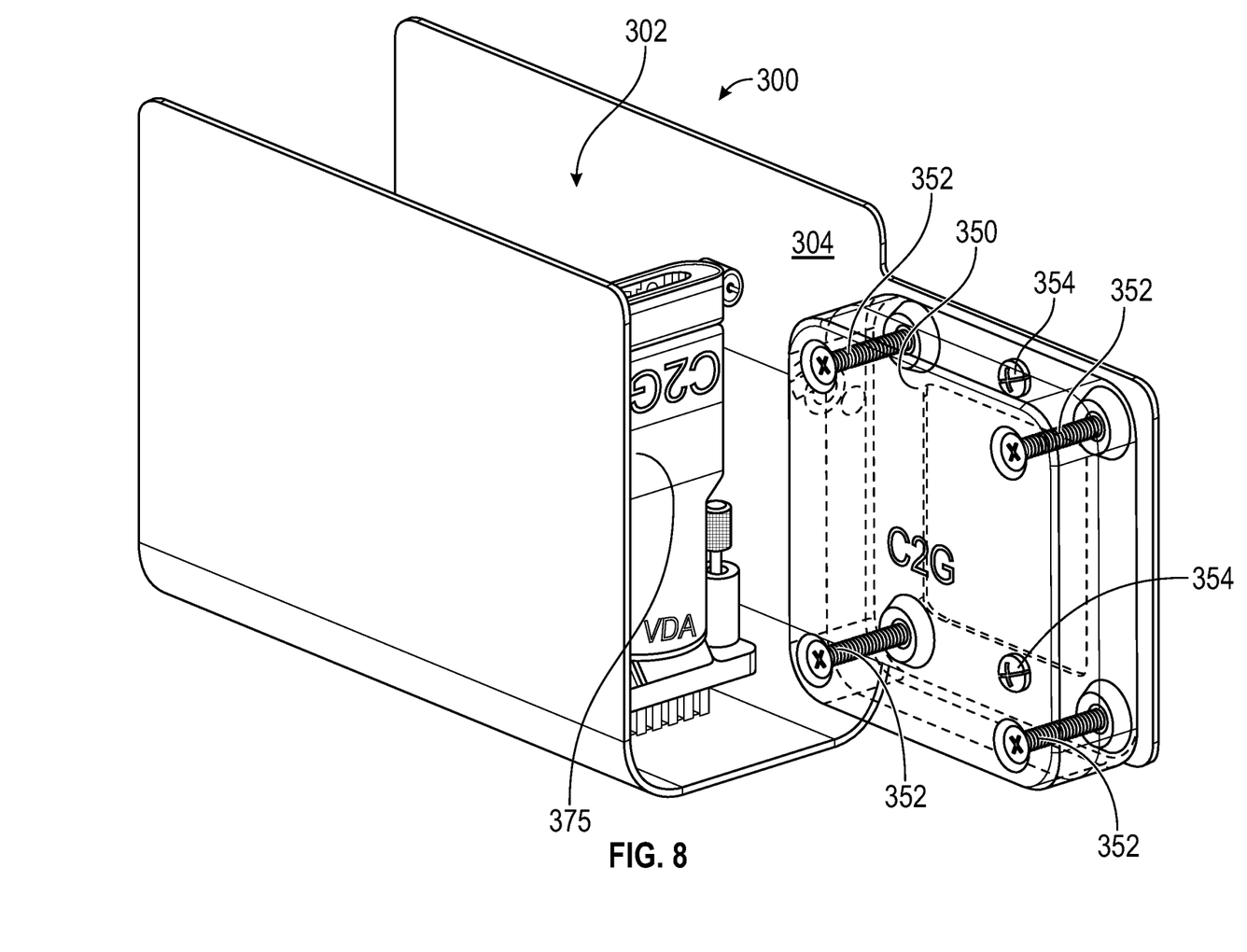
FIG. 8 is a perspective view of a mounting bracket with a housing and ancillary unit mounted with respect thereto.

With reference to FIGS. 8-10, alternative mounting assemblies for mounting of adapter-related housings are provided according to the present disclosure. Specifically, FIG. 8 depicts a substantially U-shaped mounting bracket 300 that defines an internal region 302 that is configured and dimensioned to receive an adapter-related housing (and potentially other electronic equipment, e.g., audiovisual equipment). Thus, housing 350 may be mounted with respect to a side wall 304 of mounting bracket 300 (e.g., using a pair of mounting screws 354). Mounting screws 352 may be employed to fix a first portion of housing 350 relative to a second portion of housing 350, thereby establishing an enclosure within which cable/wire may be stored, as described herein. Housing 350 may be positioned adjacent ancillary electronic equipment within the internal region 302 of mounting bracket, e.g., unit 375. Mounting bracket 300 may in turn be mounted with respect to a desired surface, e.g., a wall, a piece of furniture or the like.

Figure 9:
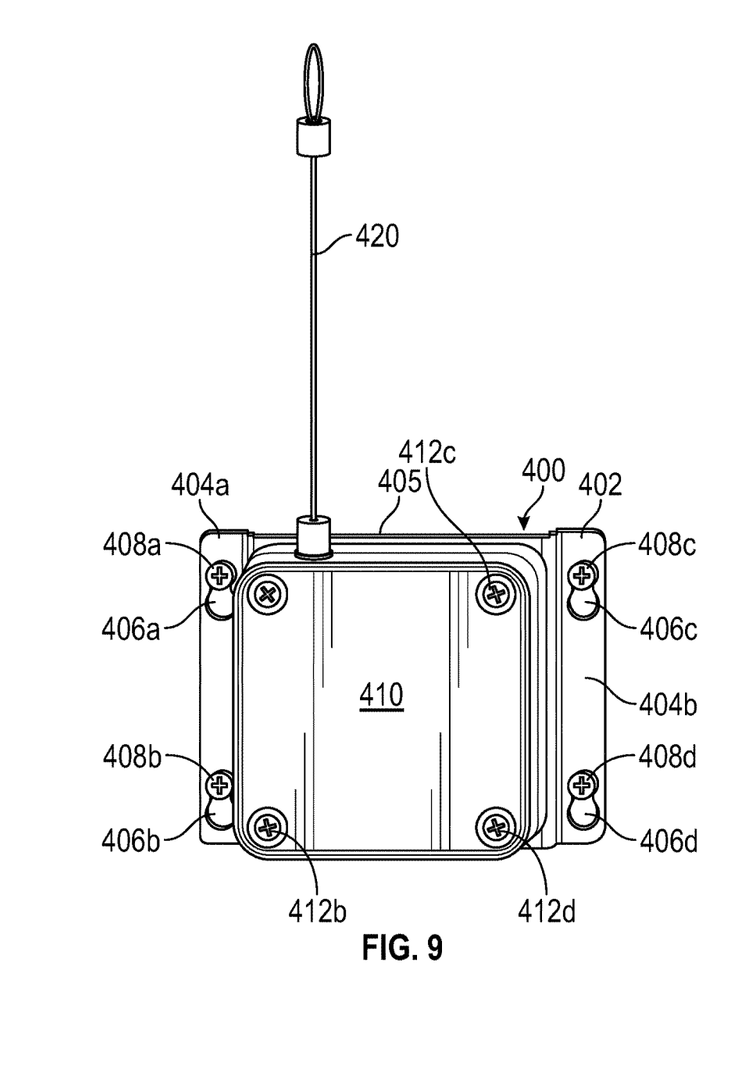
FIG. 9 is a front view of a mounting assembly according to the present disclosure.
Figure 10:
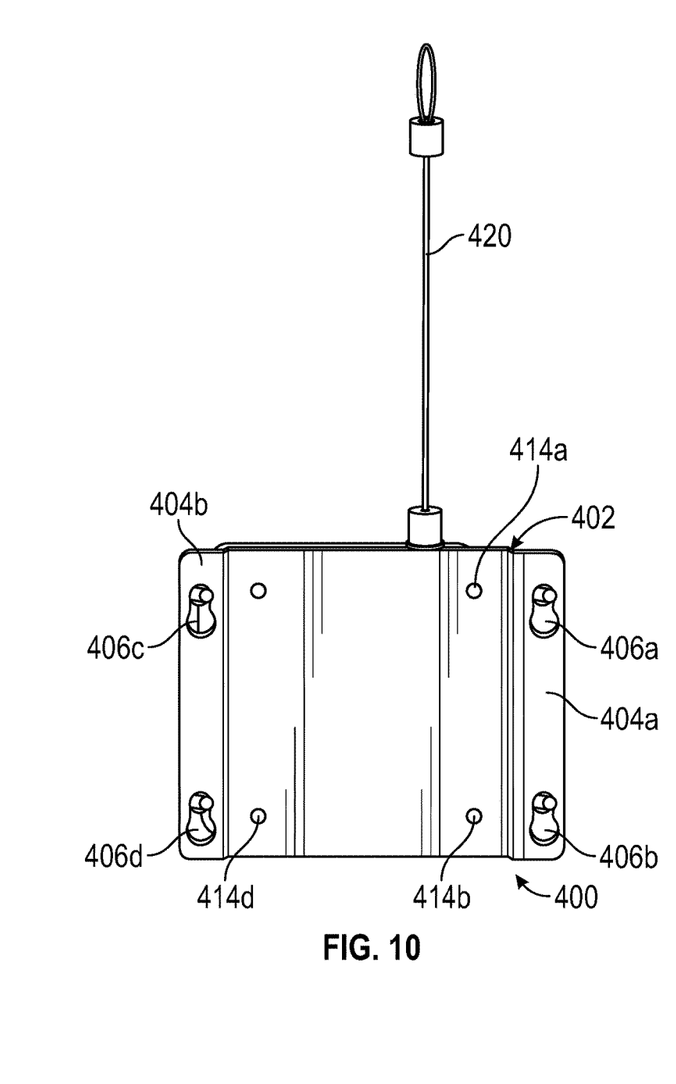
FIG. 10 is a rear view of the mounting assembly of FIG. 9.

Turning to FIGS. 9 and 10, front (FIG. 9) and rear (FIG. 10) views of a further exemplary mounting assembly 400 for adapter-related housings is schematically depicted. Mounting assembly 400 includes a mounting plate 402 that defines flange extensions 404a and 404b on either side of central plate region 405. The flange extensions 404a, 404b include mounting apertures 406a-406d that include enlarged regions to facilitate sliding of mounting screws 408a-408d once mounted to a surface, e.g., a wall or piece of furniture. Four mounting screws 412a-412d are used to mount the housing 410 to mounting plate 402. As shown in the rear view of FIG. 10, the mounting screws 412a-412d engage mounting threaded mounting apertures 414a-414d to secure the housing 410 relative to mounting plate 402. Central plate region 405 defines a plane that is offset from the plane defined by flange extensions 404a, 404b. This offset facilitates spacing of central plate region 405 from a wall/surface when mounted thereto, thereby ensuring that screws 412a-412d do not engage the wall/surface, and providing structural integrity to mounting plate 402. The mounting plate is adapted to be mounted in a plurality of orientations relative to the wall/surface (e.g., in four (4) distinct orientations with the wire/cable exiting the housing at "12 o'clock", "3 o'clock", "6 o'clock" or "9 o'clock" relative to the x-axis and y-axis of the wall/surface), thereby permitting user access to the elongated wire or cable along different axes based on the orientation of the mounting plate relative to the wall or other surface As shown in FIGS. 9 and 10, cable/wire 420 extends from housing 410. Although adapters are not shown as mounted with respect to cable/wire 420, it is to be understood that housing 410 may advantageously correspond to housings 14, 54 as described with reference to FIGS. 1 and 2. Thus, cable/wire 420 may support a plurality of adapters as described with reference to systems 10 and 50 of FIGS. 1 and 2.

Figure 11:
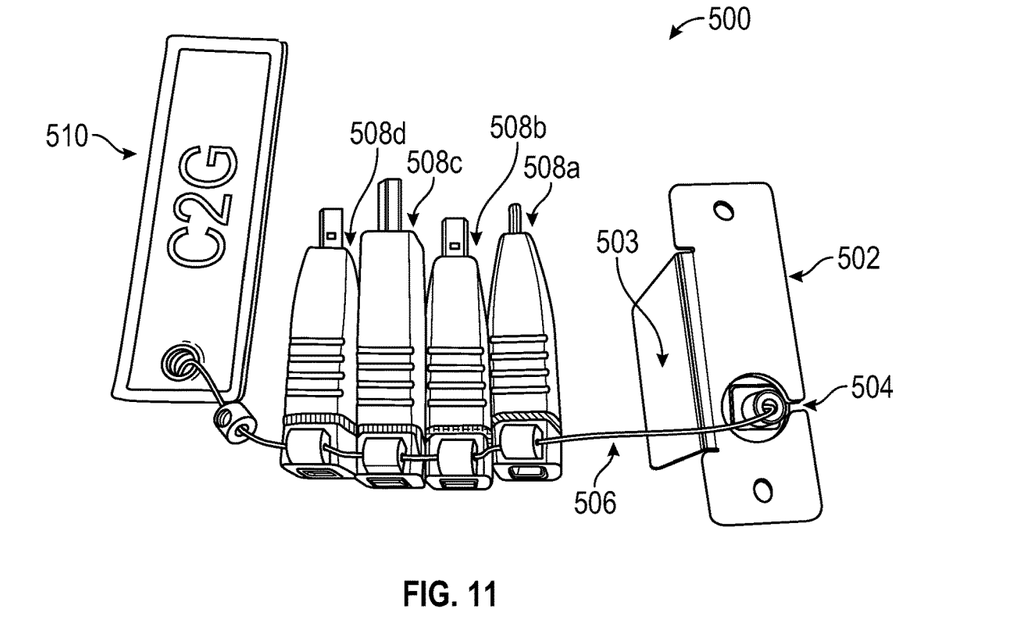
FIG. 11 is a perspective view of an alternative assembly that provides adapter security/storage according to the present disclosure.
Figure 12:
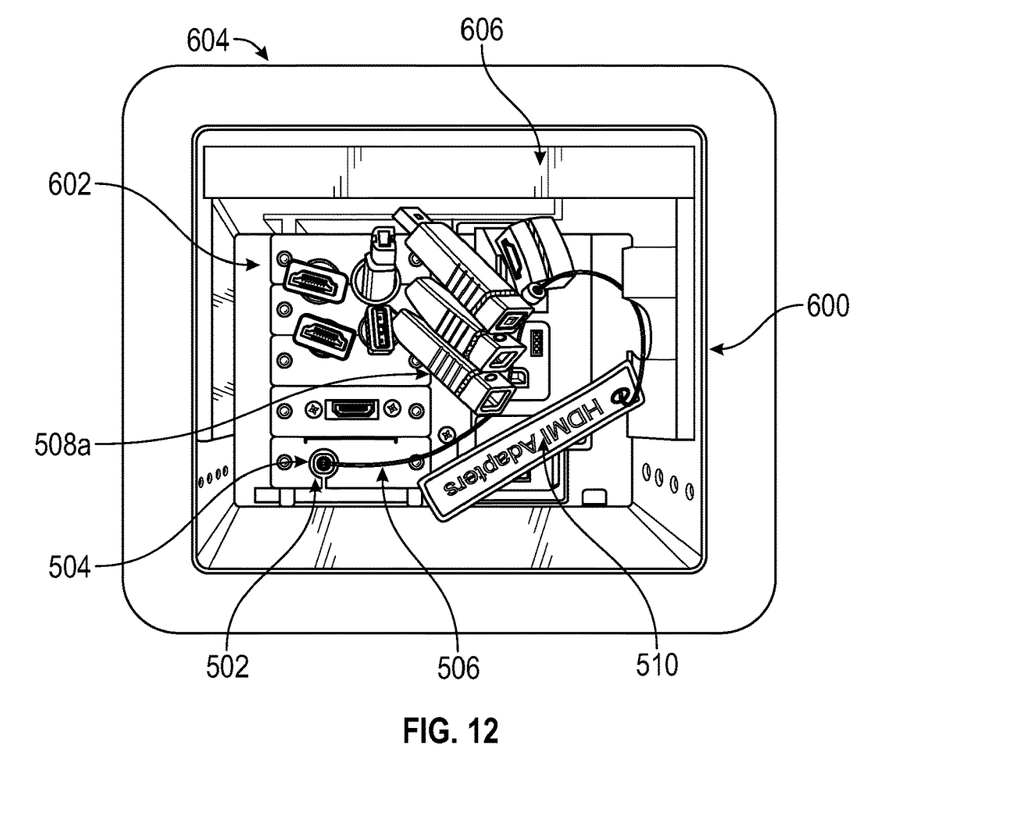
FIG. 12 is a top view of the assembly of FIG. 11 mounted within a table box that is optionally positioned within a cavity defined by a table or other surface.

With reference to FIGS. 11 and 12, an alternative assembly 500 for effectuating adapter storage and security is schematically depicted. Assembly 500 includes a mounting plate 502 that defines an opening 504 through which wire 506 travels. Opening 504 may include a strain relief feature, as also described herein. Behind/below mounting plate 502 is a housing (not visible) that may advantageously contain a retraction mechanism as described herein. A mounting wall 503 is visible in FIG. 11 extending in a perpendicular orientation relative to mounting plate 502. Mounting wall 503 may comprise an outer surface of the noted housing or may be independent of, but configured and dimensioned to cooperate with or support, the housing.

Wire 506 includes a plurality of adapters 508a, 508b, 508c, 508d mounted/connected with respect thereto. The adapters 508a-508d advantageously include identification indicia, e.g., color coding, to facilitate identification thereof by users. A pull tab 510 is mounted/connected at or adjacent to an end of wire 506 as previously described with reference to other embodiments herein. The pull tab 510 facilitates user interaction with and access to the adapters 508a-508d.

Wire/cable 506 is adapted to travel through opening 504 for storage within the housing. The retraction mechanism may apply a retraction force to draw the wire/cable 506 into the housing, as has been described above. In addition, the retraction mechanism typically includes a "lock-out" mechanism whereby the wire remains pulled out to a desired length until the user releases the lock-out mechanism and the wire/cable 506 is retracted by the retraction mechanism. The lockout feature may be effective to cause the wire to stop at preset distances and to remain extended until released for retraction.

With particular reference to FIG. 12, assembly 500 is shown mounted within a table box 600 which may, for example, be positioned within a cavity formed in a table, desk or other surface. The table box 600 defines a recessed region 602 that provides ready access to various electronic cables/connectors, as is well known in the art. The table box 600 typically includes a lip 604 that surrounds the perimeter of the recessed region 602 and facilitates positioning of the table box 600 within the noted cavity. A movable cover 606 may be associated with the table box 600 so as to shield the contents of the table box from view when closed, or allow access to the contents of the table box when open (as shown in FIG. 12).

Assembly 500 is mounted with respect to the interior of table box 600, e.g., by securing the mounting wall 503 to an internal side wall of table box 600 or by other securing methods based on the structures involved. Once mounted within the table box 600, assembly 500 provides ready access by user(s) to adapters 508a-508d. Thus, a user may open the cover of the table box 600 and draw the adapters from the recessed region 602 of table box 600, e.g., by grasping pull-tab 510 and drawing wire 502 with associated adapters 508a-508d from the recessed region 602. When drawing wire 502 from recessed region 502, wire 502 that is stored within the housing between uses is pulled through opening 504 and the wire 502 may be locked in a withdrawn position, as previously described. When use of the adapter(s) is complete, the wire 502 may be released from the lock-out position and the wire 502 may be drawn back into the housing by the retraction mechanism. As shown in FIG. 12, the portion of wire 502 that supports adapters 508a-508d will remain external to the housing, but will be shielded from view and interaction when the cover of the table box 600 is closed.

Turning to FIGS. 13, 14A-14D, 15A-15D and 16A-16D, an exemplary retraction mechanism 700 for use according to the present disclosure is schematically depicted. The present disclosure is not limited by or to exemplary retraction mechanism 700; rather, retraction mechanism 700 is but one example of a retraction mechanism that may be used according to the present disclosure.

Figure 13:
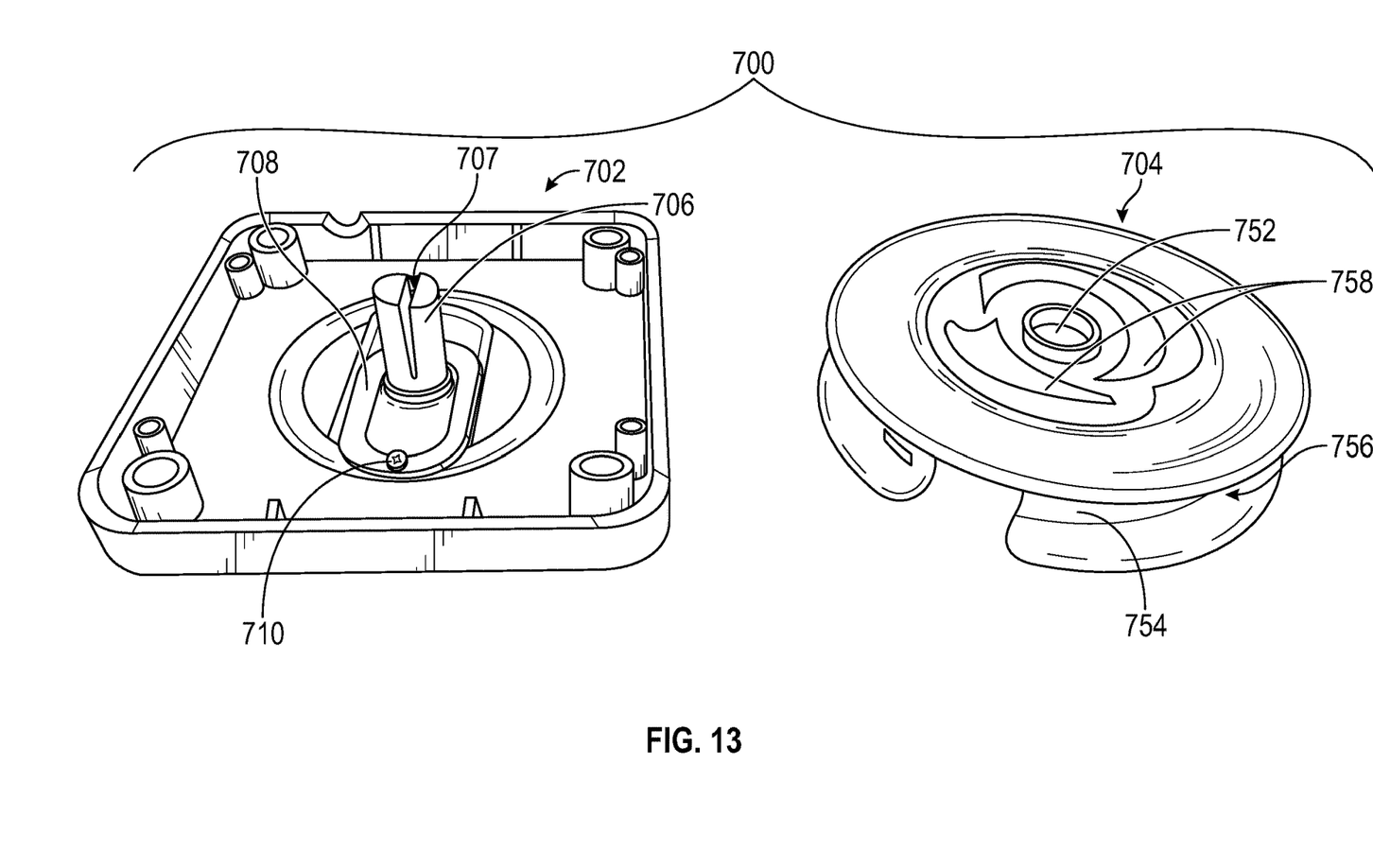
FIG. 13 is a top view of two components associated with an exemplary retraction mechanism according to the present disclosure.
Figure 14A:
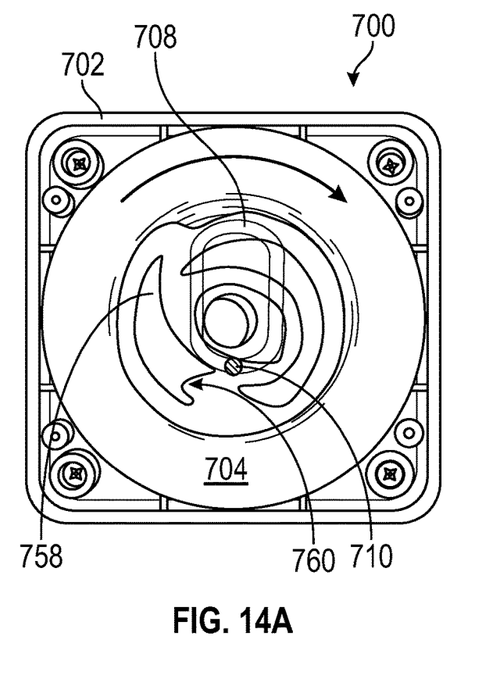
FIGS. 14A-14D are a series of images of rotational motion of the retraction mechanism of FIG. 13 as wire is pulled outward.
Figure 14B:
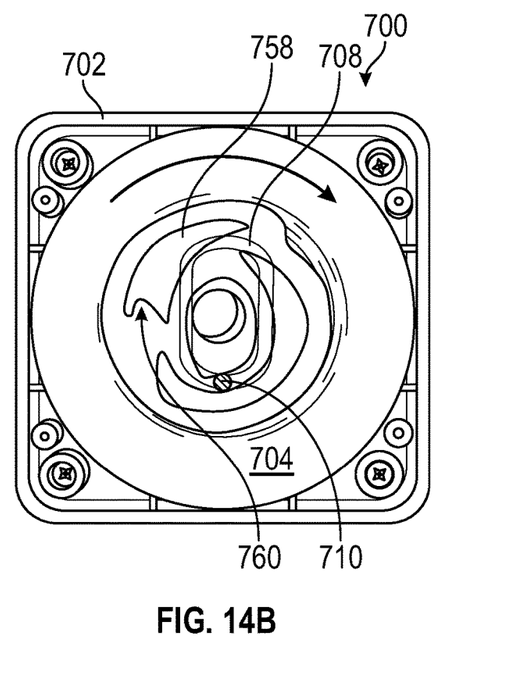
Figure 14C:
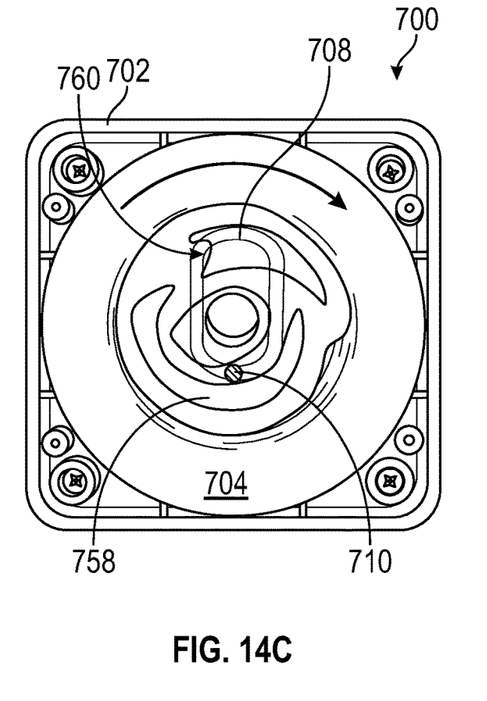
Figure 14D:
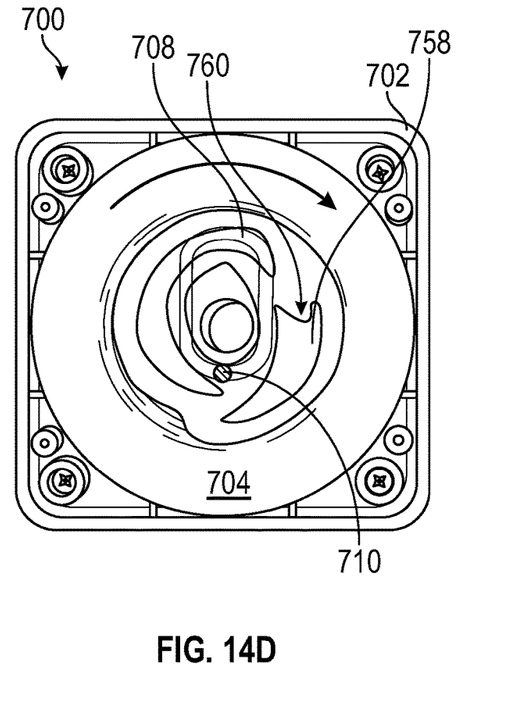

As shown in FIG. 13, retractor housing component 702 and retractor wire reel 704 are shown side-by-side. Based on the schematic depiction of FIG. 13, assembly or retractor wire reel 704 relative to retractor housing component 702 is achieved by flipping retractor wire reel 704 onto retractor housing component 702. Retractor housing 702 is adapted to combine with a second retractor housing component (not pictured) to encase retractor wire reel 704. Retractor housing component 702 includes/supports an upstanding split center post 706 that cooperates with a central aperture 752 defined in retractor wire reel 704. Slot 707 runs along split center post 706 and is configured to receive and retain a spiral spring 754 positioned within a circumferential channel 756 defined by retractor wire reel 704. An elliptical slider 708 is positioned on the base of retractor housing 702 and encircles the upstanding split center post 706. An upstanding post 710 is mounted with respect to the elliptical slider 708 and is adapted to ride within a groove pattern defined by protuberances 758 defined on a face of the retractor wire reel 704.

As schematically depicted in FIGS. 14A-14D, as a wire (not pictured) is pulled from a wire housing associated with retraction mechanism 700 against the bias of the spiral spring 754, the retractor wire reel 704 rotates clockwise relative to retractor housing component 702 (as depicted by arcuate arrows). The upstanding post 710 travels in an unencumbered fashion within the groove pattern defined by protuberances 758 as the wire is pulled out, as shown in the four views of FIGS. 14A-14D. Of note, elliptical slider 708 travels relative to retractor housing component 702 to facilitate travel of upstanding post 710 within the groove pattern.

Figure 15A:
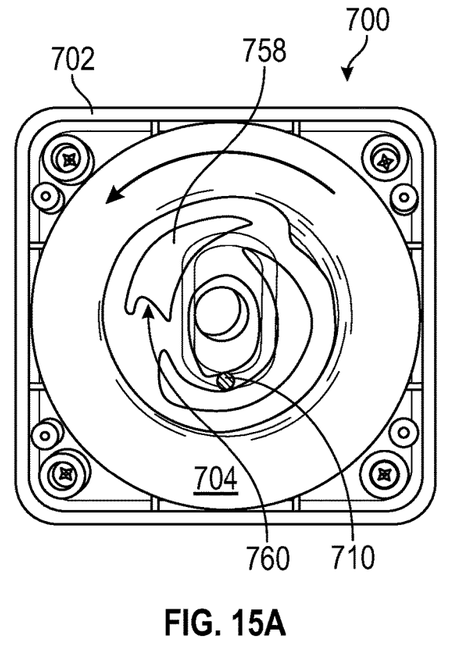
FIGS. 15A-15D are a series of images of rotational motion of the retraction mechanism of FIG. 13 as wire is drawn inward into engagement with a stop/lock according to the present disclosure.
Figure 15B:
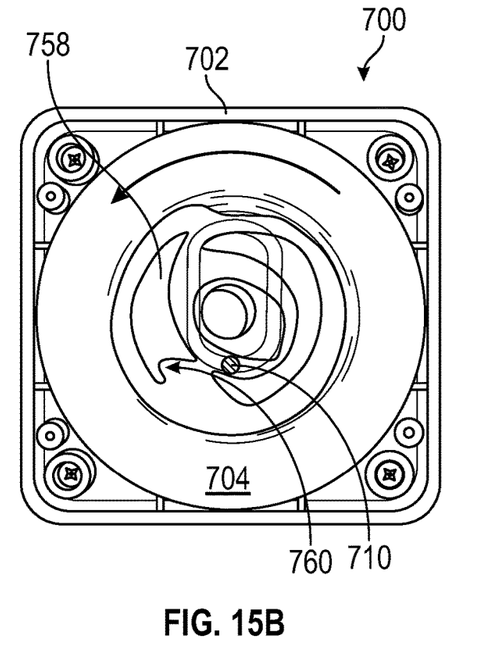
Figure 15C:
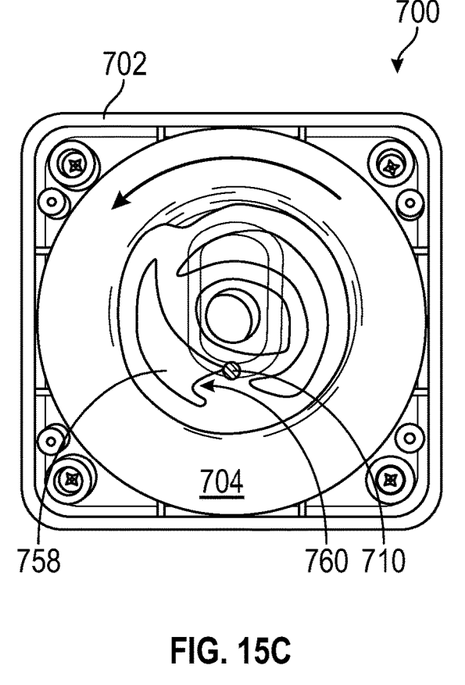
Figure 15D:
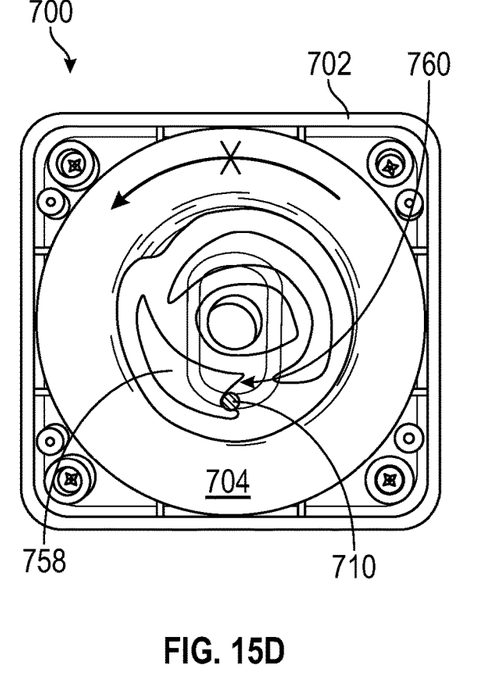

Turning to FIGS. 15A-15D, once the outward pull on the wire ceases and the return force of the retraction mechanism is allowed to act on the wire, the retractor wire reel 704 will begin to rotate counter-clockwise under the bias of a spiral spring 754. If the upstanding post 710 begins in the position shown in FIG. 15A, counter-clockwise motion of retractor wire reel 704 will cause the upstanding post 710 to enter a groove pocket 760 formed on one of the protuberances 758 (as shown in FIGS. 15C/15D), thereby blocking further counterclockwise travel of retractor wire reel 704. The interaction between upstanding post 710 and groove pocket 760 defines a "stop" or "lock" for the disclosed retraction mechanism.

Figure 16A:
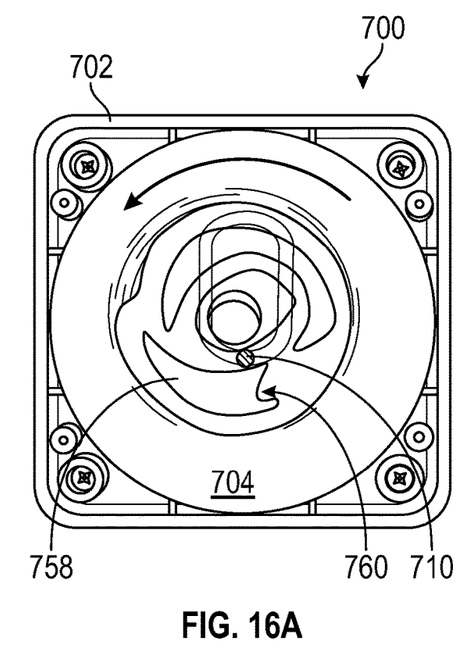
FIGS. 16A-16D are a series of images of rotational motion of the retraction mechanism of FIG. 13 as wire is drawn inward by-passing the stop/lock according to the present disclosure.
Figure 16B:
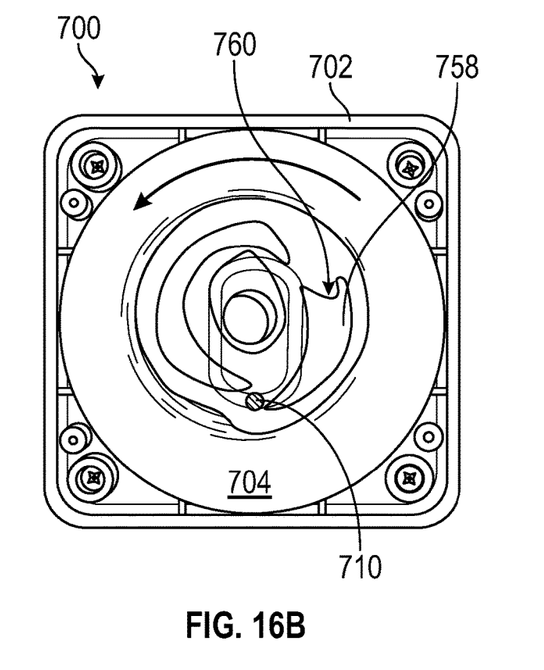
Figure 16C:
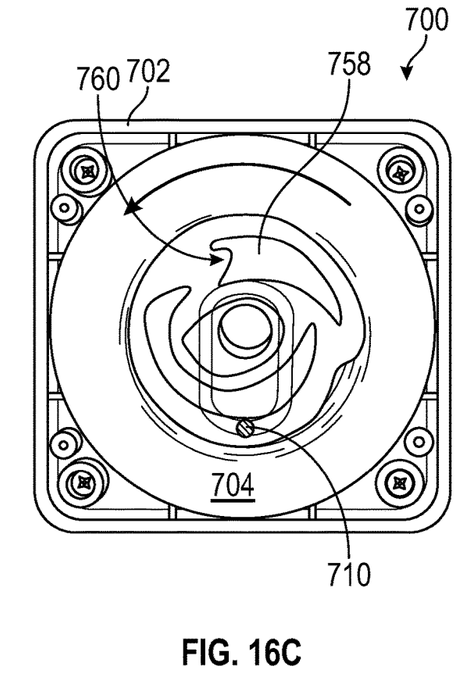
Figure 16D:
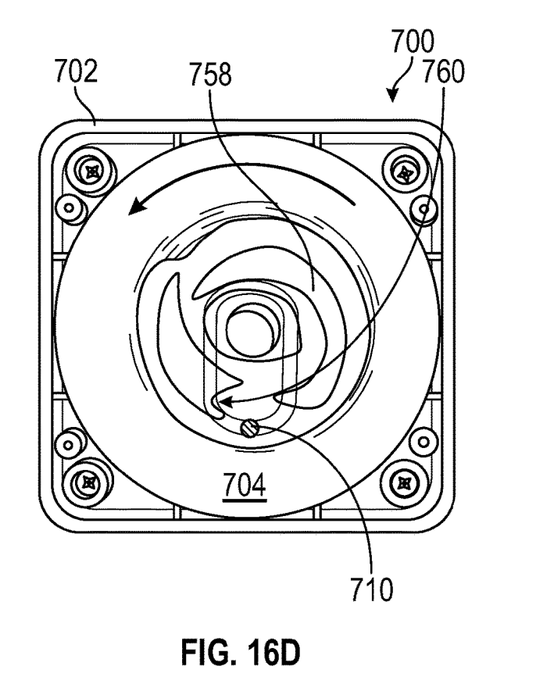

With reference to FIGS. 16A-16D, if upstanding post 710 is positioned inward of the protuberance 758 that defines groove pocket 760—as shown in FIG. 16A—then counterclockwise rotation of retractor wire reel 704 relative to retractor housing component 702 will result in upstanding post 710 be guided outward of the succeeding protuberance—as shown in FIG. 16D—and, from there, upstanding post 710 will travel in an unimpeded manner, i.e., without entering groove pocket 760, until the wire is fully retracted. Upstanding post 710 will become oriented in the position of FIG. 16A if it is released from the stop/lock position of FIG. 15D by a limited outward pull of wire—which translates to a limited clockwise rotation of retractor wire reel 704 relative to retractor housing component 702—and subsequent release of the outward pull force. Upon release of the outward pull force, the spring bias of the disclosed retraction mechanism will cause the upstanding post 710 to be positioned as shown in FIG. 16A and, from there, full retraction of the wire is enabled.

Thus, the present application provides advantageous systems for storage of and access to a plurality of adapters. The disclosed systems include a housing that includes a retraction mechanism for applying a retraction force to a wire/cable that extends therefrom. A strain relief element may be positioned on the exterior of the housing and the wire/cable may pass therethrough, thereby minimizing the potential for damage to the wire/cable as it is extended to a desired location. The adapters are mounted/secured with respect to the wire/cable and may include indicia (e.g., color indicia) that facilitate identification of the adapter type. The adapters may be movably mounted with respect to the wire/cable, and relative movement may be bounded by stops/couplers positioned at either end thereof. At the free end of the wire/cable, a pull-tab may be provided to facilitate interaction with the wire/cable and the associated adapters.

The present disclosure further provides advantageous mounting assemblies that are configured and dimensioned to receive and cooperate with the disclosed adapter-related housings. Thus, mounting assemblies that define an internal region for receipt of the housing, e.g., for table mounting, are provided. In addition, mounting assemblies that facilitate wall-based or furniture-based mounting are provided, wherein the mounting assembly functions, at least in part, to visually mask the housing from view while simultaneously providing ready access to a wire/cable that extends therefrom (and, accordingly, adapters that may be associated with the wire/cable).

The various features, functions and structures set forth in the present disclosure may be implemented separately or in combination, in whole or in part. Although the present disclosure has been provided with reference to exemplary embodiments thereof, the present disclosure is not limited by or to such exemplary embodiments. Rather, the present disclosure is susceptible to various modifications, refinements and adjustments without departing from the spirit or scope hereof.

The invention claimed is:

1. A system for providing access to one or more adapters, comprising:
   a. a housing that defines an internal region including a post;
   b. an elongated wire or cable that is at least partially positioned within the internal region of the housing and that extends from the housing;
   c. an automatic retraction mechanism positioned within the internal region of the housing and acting upon the elongated wire or cable; and
   d. one or more adapters connected with respect to an intermediate portion of the elongated wire or cable that is positioned external to the internal region of the housing;
      wherein the automatic retraction mechanism includes (i) a reel rotatably cooperating with the post of the housing, the reel configured and dimensioned to allow the elongated wire or cable to be wound therearound, and (ii) a slider encircling the post of the housing; and
      wherein the slider travels relative to the housing during rotation of the reel relative to the housing.

2. The system of claim 1, further comprising a strain relief element mounted with respect to the housing and defining a channel through which the elongated wire or cable extends.

3. The system of claim 1, wherein the one or more adapters are selected from the group consisting of DVI-D to HDMI adapter(s), Micro-HDMI to HDMI adapter(s), Mini-HDMI to HDMI adapter(s), Mini-DisplayPort to HDMI adapter(s), DisplayPort to HDMI adapter(s), VGA to HDMI adapter(s), MHL to HDMI adapter(s), and/or USB to HDMI adapter(s).

4. The system of claim 1, wherein the one or more adapters include identifying indicia.

5. The system of claim 4, wherein the identifying indicia include color indicia.

6. The system of claim 1, wherein the one or more adapters are movably mounted with respect to the wire or cable.

7. The system of claim 6, wherein the movement of the one or more adapters is limited by (i) a first stop located between the housing and the adapters, and (ii) a second stop located adjacent to a free end of the wire or cable.

8. The system of claim 7, further comprising a further stop positioned between the one or more adapters and the housing to control the minimum distance between the one or more adapters and the housing.

9. The system of claim 1, wherein the automatic retraction mechanism includes a lock-out feature that prevents retraction of the elongated wire or cable until released.

10. The system of claim 1, further comprising a pull tab mounted with respect to a free end of the elongated wire or cable.

11. An assembly that provides access to one or more adapters, the assembly comprising:
    a. a mounting structure that defines at least one outer wall, the mounting structure defining a receiving region that is configured and dimensioned to receive a housing;
    b. a housing removably positioned within the receiving region of the mounting structure, and that defines an internal region that includes a post;
    c. an elongated wire or cable that is at least partially positioned within the internal region of the housing and that extends from the housing;
    d. an automatic retraction mechanism positioned within the internal region of the housing and acting upon the elongated wire or cable; and
    e. one or more adapters connected with respect to an intermediate portion of the elongated wire or cable that is positioned external to the internal region of the housing;

wherein the automatic retraction mechanism includes (i) a reel rotatably cooperating with the post of the housing, the reel configured and dimensioned to allow the elongated wire or cable to be wound therearound, and (ii) a slider encircling the post of the housing; and wherein the slider travels relative to the housing during rotation of the reel relative to the housing.

12. The assembly of claim 11, wherein the mounting structure is adapted to be mounted with respect to a wall or other surface.

13. The assembly of claim 11, wherein the mounting structure is adapted to be positioned on a flat surface.

14. The assembly of claim 13, wherein the flat surface is a table, counter or other piece of furniture.

15. The assembly of claim 11, wherein the elongated wire or cable extends beyond the mounting structure for user access thereto.

16. The assembly of claim 11, wherein the automatic retraction mechanism includes a lock-out feature that prevents retraction of the elongated wire or cable until released.

17. The assembly of claim 11, further comprising a pull tab mounted with respect to a free end of the elongated wire or cable.

18. An assembly that provides access to one or more adapters, the assembly comprising:
   a. a mounting plate that defines at least two mounting flange regions and a mounting surface between the at least two mounting flange regions;
   b. a housing removably mounted with respect to the mounting surface of the mounting plate, and that defines an internal region that includes a post;
   c. an elongated wire or cable that is at least partially positioned within the internal region of the housing and that extends from the housing;
   d. an automatic retraction mechanism positioned within the internal region of the housing and acting upon the elongated wire or cable; and
   e. one or more adapters connected with respect to an intermediate portion of the elongated wire or cable that is positioned external to the internal region of the housing;
   wherein the automatic retraction mechanism includes (i) a reel rotatably cooperating with the post of the housing, the reel configured and dimensioned to allow the elongated wire or cable to be wound therearound, and (ii) a slider encircling the post of the housing; and
   wherein the slider travels relative to the housing during rotation of the reel relative to the housing.

19. The assembly of claim 18, wherein the housing is mounted in four (4) possible orientations relative to a wall or other surface when mounted to the mounting plate, thereby permitting user access to the elongated wire or cable along different axes based on the orientation of the mounting plate relative to the wall or other surface.

20. The assembly of claim 18, wherein the automatic retraction mechanism includes a lock-out feature that prevents retraction of the elongated wire or cable until released.

21. The assembly of claim 18, further comprising a pull tab mounted with respect to a free end of the elongated wire or cable.

22. An assembly that provides access to one or more adapters, the assembly comprising:
   a. a mounting subassembly that is adapted for mounting within a recessed region associated with a table box;
   b. a housing mounted with respect to the mounting subassembly, the housing defining an internal region that includes a post;
   c. an elongated wire or cable that is at least partially positioned within the internal region of the housing and that extends from the housing;
   d. an automatic retraction mechanism positioned within the internal region of the housing and acting upon the elongated wire or cable; and
   e. one or more adapters connected with respect to an intermediate portion of the elongated wire or cable that is positioned external to the internal region of the housing;
   wherein the automatic retraction mechanism includes (i) a reel rotatably cooperating with the post of the housing, the reel configured and dimensioned to allow the elongated wire or cable to be wound therearound, and (ii) a slider encircling the post of the housing; and
   wherein the slider travels relative to the housing during rotation of the reel relative to the housing.

23. The assembly of claim 22, further comprising a table box that defines a recessed region, and wherein the mounting assembly is mounted within the recessed region of the table box.

24. The assembly of claim 23, wherein the table box includes a cover and wherein, when the cover of the table box is in a closed orientation, the one or more adapters are shielded from view and access within the table box.

25. The assembly of claim 24, wherein the table box is mounted at least partially within a cavity defined by a table, a desk or other surface.

26. The assembly of claim 23, wherein the automatic retraction mechanism includes a lock-out feature that prevents retraction of the elongated wire or cable until released.

27. The assembly of claim 23, further comprising a pull tab mounted with respect to a free end of the elongated wire or cable.

* * * * *